(12) United States Patent
Clément et al.

(10) Patent No.: US 12,374,167 B2
(45) Date of Patent: Jul. 29, 2025

(54) DEPORTED COMPUTE FOR TELEOPERATION AND AUTONOMOUS SYSTEMS

(71) Applicant: Teleo, Inc., Mountain View, CA (US)

(72) Inventors: Romain Clément, Mountain View, CA (US); Vinay Shet, Fremont, CA (US)

(73) Assignee: Teleo, Inc., Mountain View, CA (US)

( * ) Notice: Subject to any disclaimer, the term of this patent is extended or adjusted under 35 U.S.C. 154(b) by 474 days.

(21) Appl. No.: 17/243,562

(22) Filed: Apr. 28, 2021

(65) Prior Publication Data

US 2021/0343091 A1    Nov. 4, 2021

Related U.S. Application Data

(60) Provisional application No. 63/017,599, filed on Apr. 29, 2020.

(51) Int. Cl.
| | | |
|---|---|---|
| *B60W 50/00* | (2006.01) | |
| *G05B 13/02* | (2006.01) | |
| *G07C 5/00* | (2006.01) | |
| *B60W 30/095* | (2012.01) | |

(52) U.S. Cl.
CPC ......... *G07C 5/008* (2013.01); *B60W 50/0097* (2013.01); *G05B 13/026* (2013.01); *B60W 30/0956* (2013.01); *B60W 2554/4041* (2020.02); *B60W 2554/4042* (2020.02); *B60W 2554/4043* (2020.02); *B60W 2554/4044* (2020.02); *G05B 13/0265* (2013.01)

(58) Field of Classification Search
CPC ........... B60W 30/0956; B60W 50/0097; E02F 9/2045; E02F 9/205; E02F 9/2054; G01C 21/3407; G01C 21/3856; G01C 21/3863; G01C 21/3889; G05B 13/026; G05B 13/0265; G05D 1/0027; G07C 5/008; G08G 1/0112; G08G 1/0133; G08G 1/0145; G08G 1/096811; G08G 1/096827; G08G 1/096844; G08G 1/202; G08G 1/207; H04W 4/44
See application file for complete search history.

(56) References Cited

U.S. PATENT DOCUMENTS

| | | | |
|---|---|---|---|
| 2007/0052289 A1* | 3/2007 | Nilsson | F16D 66/02 303/155 |
| 2012/0265371 A1* | 10/2012 | Buschmann | G01C 21/3863 701/2 |
| 2019/0026886 A1* | 1/2019 | Ferguson | G06V 20/588 |
| 2019/0082377 A1* | 3/2019 | Silver | G08G 1/096741 |
| 2019/0137999 A1* | 5/2019 | Taguchi | B60W 30/0956 |
| 2019/0193681 A1* | 6/2019 | Ito | B60R 25/246 |
| 2020/0029490 A1* | 1/2020 | Bertucci | G05D 1/247 |
| 2020/0110423 A1* | 4/2020 | Antich | G05D 1/0287 |
| 2020/0192351 A1* | 6/2020 | Rastoll | G05D 1/0038 |

(Continued)

*Primary Examiner* — Peter D Nolan
*Assistant Examiner* — Ce Li Li
(74) *Attorney, Agent, or Firm* — Cognition IP, P.C.; Edward Steakley; Saleh Kaihani

(57) ABSTRACT

A method and system may receive data generated by a plurality of remotely situated vehicles. Various operations are performed with respect to portions of the received data to generate first output representing one or more vehicle actions. Various operations are performed with respect to portions of the received data to generate second output representing one or more control center actions.

20 Claims, 8 Drawing Sheets

(56) References Cited

U.S. PATENT DOCUMENTS

| | | | | |
|---|---|---|---|---|
| 2021/0000006 | A1* | 1/2021 | Ellaboudy | A01B 69/008 |
| 2021/0185587 | A1* | 6/2021 | Chelminski | H04W 4/46 |
| 2021/0341917 | A1* | 11/2021 | Feng | G05D 1/0022 |
| 2022/0282456 | A1* | 9/2022 | Watanabe | B60L 3/0092 |
| 2023/0033690 | A1* | 2/2023 | Factor | G01S 3/78 |
| 2023/0137980 | A1* | 5/2023 | Yamane | B60W 50/14 |
| | | | | 701/2 |

* cited by examiner

DEPORTED COMPUTE FOR TELEOPERATION AND AUTONOMOUS SYSTEMS

CROSS-REFERENCE TO RELATED APPLICATIONS

This application claims the benefit of U.S. Provisional Application No. 63/017,599, filed Apr. 29, 2020, which is hereby incorporated by reference in its entirety.

FIELD OF THE INVENTION

The present invention relates generally to methods of deported computing, and more particularly, to methods and apparatuses for deported computing for teleoperation and autonomous systems.

BACKGROUND

The field of autonomous vehicles has recently experienced a tremendous amount of innovation, as well as popular interest. Autonomous vehicle technology is currently under development for a wide range of commercial, transportation and logistical situations. Ridesharing companies are attempting to develop a fleet of taxis without drivers and low-altitude flight vehicles without pilots suitable for small range flights around a metropolitan area. Retailers in the eCommerce space are developing delivery drones to avoid the high and unpredictable costs often associated with the final stage of product delivery to customers. Shipping companies seek the lower transit times that could be a benefit of replacing truck drivers with autonomously operated trucks. The development of these systems requires technologies that optimize cost, safety and the computing resources needed to bring the autonomous solutions up to scale.

SUMMARY OF THE INVENTION

One embodiment relates to a base station system receiving data generated by a plurality of vehicles remotely situated away from a system. The base station system inputs a first portion of the received data into vehicle operations to generate first output representing one or more vehicle actions. The base station system selects a portion of the first output that corresponds to each respective vehicle. Each select portion of the first output represents vehicle actions to be performed by a corresponding respective vehicle. The base station system inputs a second portion of the received data into control center operations to generate second output representing control center actions. The base station system triggers transmission of the second output to a control center remotely situated away from the system and the plurality of vehicles.

Another embodiment relates to a system, method and computer program product for creating, by one or more base stations that are physically situated proximate to a pre-defined geographical area, a micro-cloud computing environment localized to the pre-defined geographical area. A base station(s) receives data generated by one or more vehicles sent via the localized micro-cloud computing environment. Each of the vehicles operate at the pre-defined geographical area and is remotely situated away from the base stations present at the pre-defined geographical area. The base station(s) provides access to one or more base station high-power compute resources for pre-processing the received data. The base station(s) executes one or more vehicle functions with the pre-processed data. Based on execution of the vehicle functions, the base station(s) generates output representing one or more vehicle actions and/or one or more control center operations.

Another embodiment relates to receiving data generated by a plurality of remotely situated vehicles at a node of a plurality of site-mesh nodes. A first portion of the received data may be input for vehicle operations to generate first output representing one or more vehicle actions. A portion of the first output that corresponds to each respective vehicle may be selected. Each select portion of the first output represents vehicle actions to be performed by a corresponding respective vehicle. A second portion of the received data may be input for control center operations to generate second output representing control center actions. Transmission of the second output to a remotely situated may be triggered.

Embodiments may relate to each respective site-mesh node individually generating its own respective first output and respective second output. In some embodiments, operation of the plurality of site-mesh nodes creates a mesh network at a pre-defined geographical area for transmissions between each respective site-mesh node and a plurality of remotely situated vehicles operating within the pre-defined geographical area.

Embodiments may relate to a pre-defined geographical area being a construction site and the plurality of remotely situated vehicles may be a vehicle for operation at the construction site area.

Additional features and advantages will be set forth in the description which follows, and in part will be implicit from the description, or may be learned by the practice of the embodiments.

DETAILED DESCRIPTION

Figure 1A:
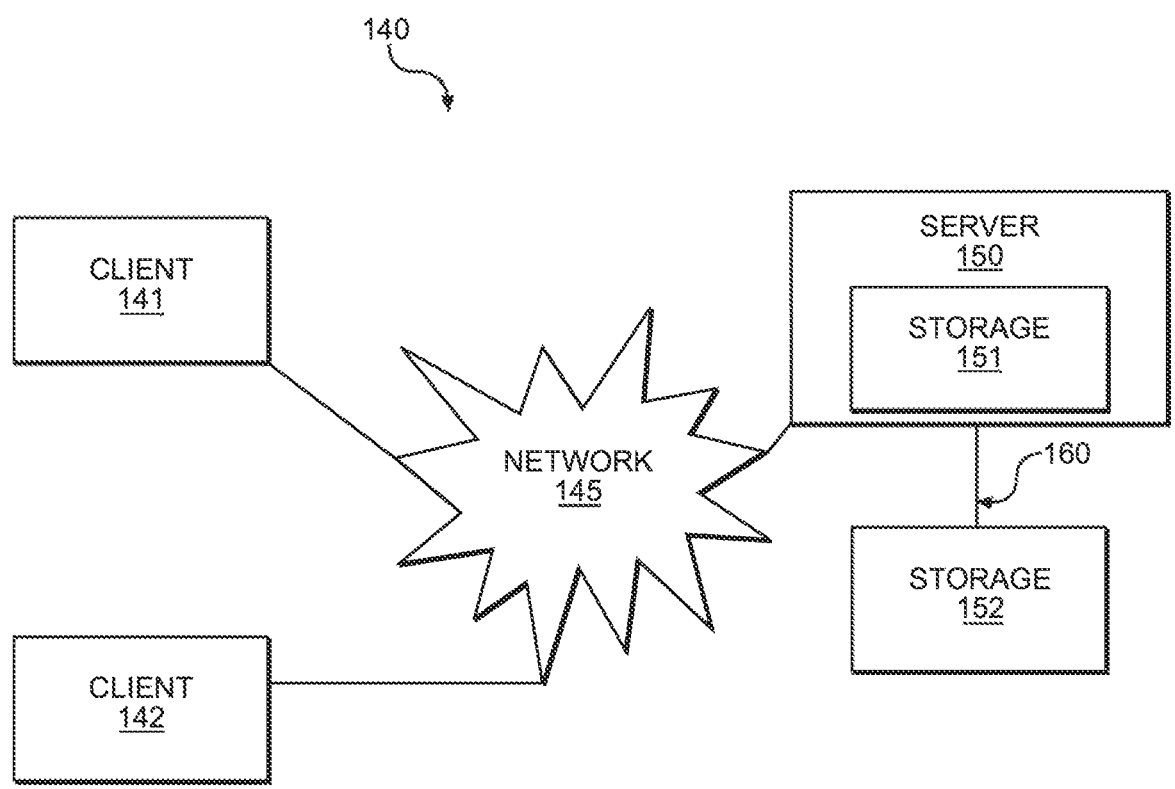
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

For teleoperation and automation of vehicles and equipment, expensive and complex computing systems are typically deployed on each vehicle or piece of equipment. While ample compute resources exist in the cloud, the latency associated to reach those compute resources and the availability to those compute resources might not be available at locations where the equipment and vehicles are deployed. The various embodiments described herein provide the advantages over conventional techniques by leveraging the existence of a (local) high bandwidth, low latency (wireless) telecommunications system to centralize the compute capabilities at a base station(s) at a fixed and proximate location to the equipment and vehicles. It understood that various embodiments may include a plurality of base stations where each base station may be a respective site-mesh node. Operation of a plurality of site-mesh nodes creates a mesh network at a pre-defined geographical area for transmissions between each respective site-mesh node and a plurality of remotely situated vehicles and pieces of equipment operating within the pre-defined geographical area.

Various advantages of the embodiments described herein include, but are not limited to, each vehicle and pieces of equipment benefits from higher compute resources than it possesses. Vehicle and equipment data can be pre-processed by the deported compute (i.e. base station, site-mesh system, site-mesh node) enabling, for example, further data compression, object detection, path planning, prediction, determining positions of vehicles, equipment, people and objects. The various advantages result, for example, in a better overall leveraging of computer resources at a given pre-defined geographical area by executing scheduling, staging and/or prioritization computing tasks at one or more base stations rather than having each vehicle individually perform those computing tasks. An additional exemplary advantage includes leveraging the existence of a high bandwidth, low latency telecommunication system created by a plurality of base stations to create a "local micro cloud" that improves the efficiency of teleoperation of the vehicles.

It is understood that the terms "vehicles" or "robot" may mean any platform which could be operated over teleoperation. According to various embodiments, a vehicle may be, but is not limited to, a skid steer, a compact track loader, a wheeled loader, a backhoe, an excavator, a loading trick, a bulldozer and a compactor.

FIG. 1A illustrates an exemplary network environment in which embodiments may operate. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between the base station and one or more control centers may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141 and 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
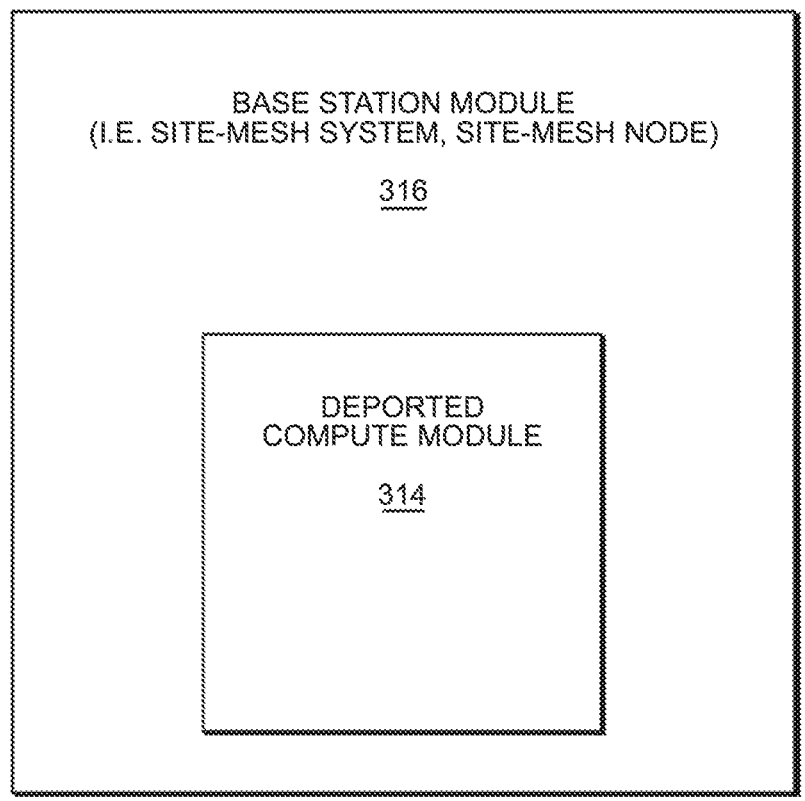
FIG. 1B is a diagram illustrating an exemplary environment in which some embodiments may operate.
Figure 2:
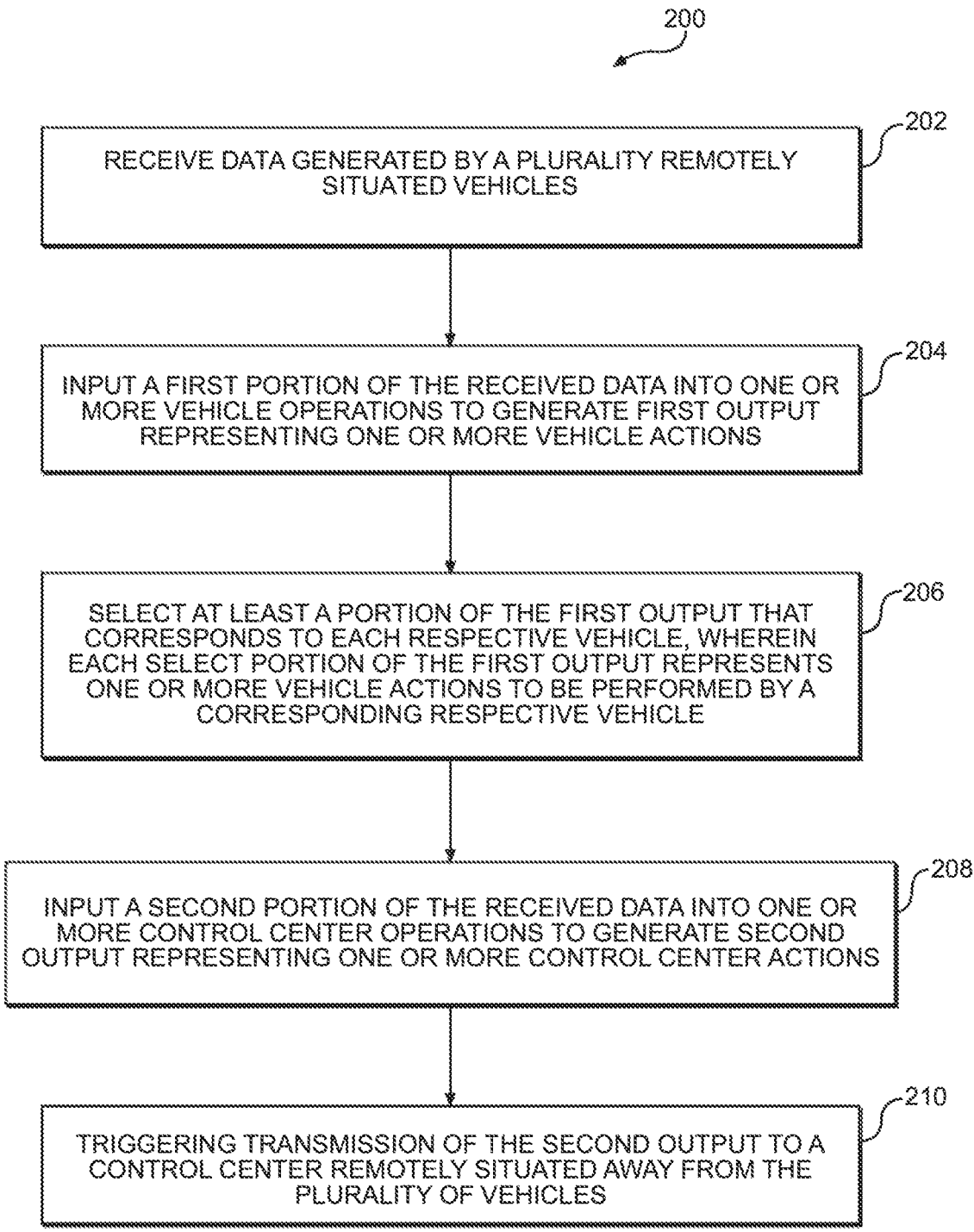
FIG. 2 is a flow chart illustrating an exemplary method that may be performed in some embodiments.
Figure 3:
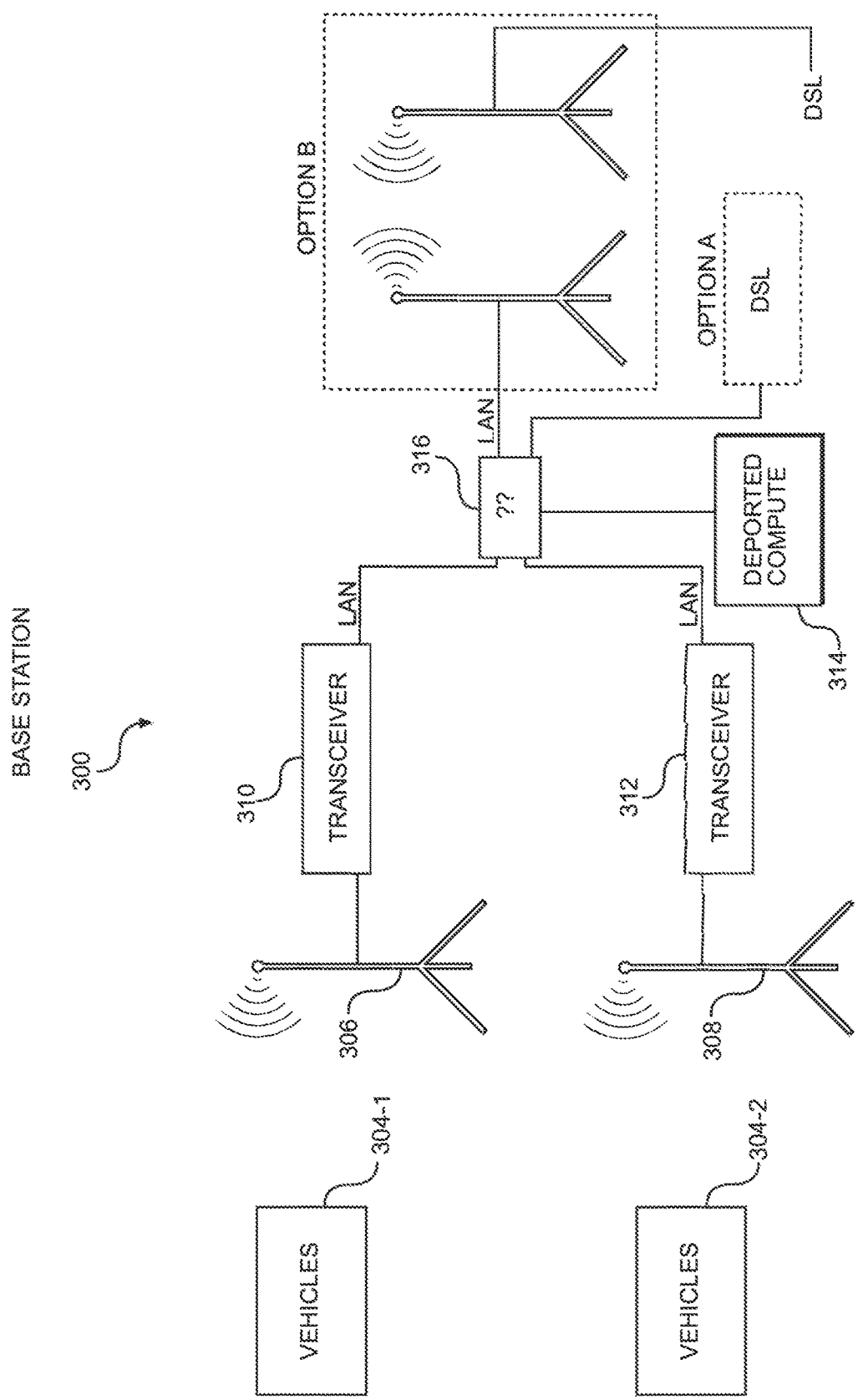
FIG. 3 is a diagram illustrating an exemplary environment in which some embodiments may operate.
Figure 4:
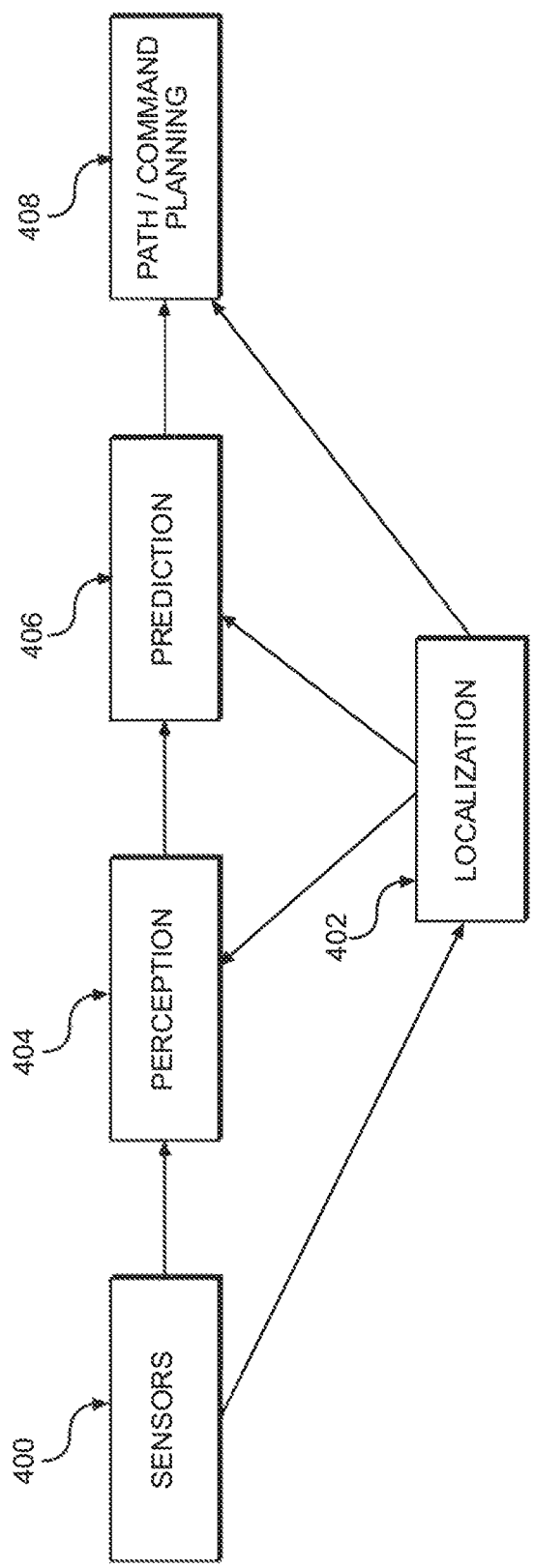
FIG. 4 is a diagram illustrating an exemplary environment in which some embodiments may operate.

FIG. 1B illustrates exemplary software modules, such as base station module 316 with a deported compute module 314, that may execute some of the functionality described herein by FIGS. 2, 3 and 4. The base station module 316 receives data generated by some of the functionality described herein by FIGS. 5 and 6. The modules 314, 316 may also include artificial intelligence modules to run one or more machine learning networks with respect to any type of data received from the vehicles. According to some embodiments, the artificial intelligence modules may generate a prediction(s) for any type of data generated by a base station described herein. The one or more machine learning networks include, but are not limited to, a neural net based algorithm, such as Artificial Neural Network, Deep Learning; a robust linear regression algorithm, such as Random Sample Consensus, Huber Regression, or Theil-Sen Estimator; a tree-based algorithm, such as Classification and Regression Tree, Random Forest, Extra Tree, Gradient Boost Machine, or Alternating Model Tree; Naïve Bayes Classifier; and other suitable machine learning algorithms.

FIG. 2 is a flow chart illustrating one exemplary method 200 that may be performed consistent with an embodiment. The computer system (i.e. base station module 316) may receive data generated by a plurality of vehicles remotely situated away from the system (Act 202). Each vehicle in the plurality if vehicle may have multiple vehicle sensors. The received data may be sensor data generated by one or more of the vehicle sensors. For example, where the plurality of vehicles includes three vehicles (vehicle A, vehicle B and vehicle C), the computer may receive data generated by sensors on each of the three vehicles.

In response, the computer system may input a first portion of the received data into vehicle operations to generate first output representing vehicle actions (Act 204). Various vehicle operations may include, but are not limited to: vehicle perception operations, vehicle prediction operations, vehicle path planning operations and vehicle localization operations. For example, received data from vehicle A may be input for the vehicle localization operations that generate further input data for the vehicle perception operations, vehicle prediction operations and vehicle path planning operations. Received data from vehicle B and vehicle C may each be separately input for the vehicle localization operations as well.

The computer system may select various portions of the first output that corresponds to each respective vehicle (Act 206). The select first output portions(s) represents vehicle actions to be performed by a corresponding respective vehicle. For example, output from the vehicle perception operations with respect to input sensor data received from vehicle A may represent actions to be performed by vehicle A in response to perception of a physical object(s) proximate to vehicle A, such as a nearby person, building, tree or another vehicle. For example, output from the vehicle prediction operations with respect to input sensor data received from vehicle B may represent actions to be performed by vehicle B in response to a forecast of a location of various physical object(s). The output from the vehicle prediction operations may instruct vehicle B to stop, turn or reverse based on a forecasted location of a person. For example, output from the vehicle path planning operations with respect to input sensor data received from vehicle C may represent actions to be performed by vehicle C with respect to a currently traveled path of vehicle C. The output from the vehicle path planning operations may instruct vehicle C to continue the currently traveled path or to alter the currently traveled path.

The computer system may input a second portion of the received data into control center operations to generate second output representing control center actions (Act 208). For example, various portions of the input sensor data received from vehicle A, vehicle B and vehicle C may be used to generate both the first output representing vehicle actions and the second output representing control center actions per each vehicle. Additionally, various portions of the received sensor data from vehicle A, vehicle B and vehicle C may be used separately to generate the first output representing vehicle actions and the second output representing control center actions per each vehicle. According to various embodiments, the second output representing control center actions may be a request for an operator present at a control center to provide approval for a determined vehicle action. The second output representing control center actions may be a video stream received from a vehicle that is augmented by the computer system and relayed to the control center. The computer system may trigger transmission of the second output to a control center remotely situated away from the system and the plurality of vehicles (Act 210).

According to various embodiments, the computer system may be a site-mesh system that is part of a plurality of site-mesh systems, where each respective site-mesh system generates respective first output vehicle actions and second output control center actions, either individually or in cooperation with other site-mesh systems. The plurality of site-mesh systems may be physically located proximately to (or within) a pre-defined geographical area while the plurality of vehicles may each be remotely situated away from each respective site-mesh system. The plurality of site-mesh systems creates a mesh network at the pre-defined geographical area for transmissions amongst each respective site-mesh system and each vehicle in the plurality of vehicles. Each vehicle may operate within the pre-defined geographical area. For example, the pre-defined geographical area may be a construction site area and each vehicle may be a vehicle for operation at the construction site area. The control center may be remotely situated away from the construction site area, the construction vehicles and the plurality of site-mesh systems.

It is understood that acts 204, 206, 208 may be performed by a deported compute module 314. Some of the acts of exemplary method 200 may be performed in different orders or in parallel. Also, the acts of exemplary method 200 may occur in two or more computers, for example if the method is performed in a networked environment. Various acts may be optional. Some acts may occur on a local computer with other acts occurring on a remote computer. It is understood that the embodiments described herein are not limited to three vehicles and can include any number of vehicles and individual site-mesh systems.

As shown in FIG. 3, a base station environment 300 (i.e. site-mesh system environment, site-mesh node environment, localized micro cloud environment) includes a base station 316 (i.e. site-mesh system, site-mesh node) with a deported compute 314 module. One or more vehicles 304-1, 304-2 may be in pre-defined geographical area. The various vehicles 304-1, 304-2 send vehicle sensor data to transceivers 310, 312 connected to the base station. The deported compute module 314 receives various portions of the vehicle sensor data. The deported compute module 314 generates, for each vehicle individually, vehicle operation output and control center output. The base station 316 transmits the vehicle operation output to each corresponding vehicle 304-1, 304-2 and the control center output to a remotely situated control center. For example, the control center may be located outside the boundaries of the pre-defined geographical area. In other embodiments, vehicle sensor data may be received wirelessly or via DSL and output from deported compute module 314 may be transmitted wirelessly or via DSL.

As shown in FIG. 4, vehicle sensors 400 may send vehicle sensor data to a base station 316 (i.e. site-mesh system, site-mesh node). The base station 316 may send the received vehicle sensor data to a deported compute module(s) 314 located within the base station 316. The base station 316 provides access to base station high power compute resources to pre-process the received vehicle sensor data, such as one or more vehicle localization operations 402. The received vehicle sensor data may also be input into one or more vehicle perception operations 404. Vehicle perception output may be fed into one or more vehicle prediction operations 406. Vehicle prediction output may be fed into one or more vehicle path planning operations 408. Output from each of the vehicle localization operations 402, vehicle perception operations 404, vehicle prediction operations 406 and vehicle path planning operations 408 may each be sent to one or more corresponding vehicles or as part of output to be sent to a control center. There may be any number of deported compute modules located within the base station 316. According to various embodiments, a deported compute module 314 may execute the operations 402, 404, 406, 408. It is understood that the base station 316 also provides access to base station high power compute resources for execution of the perception operations 404, prediction operations 406 and path planning operations 408.

Figure 5:
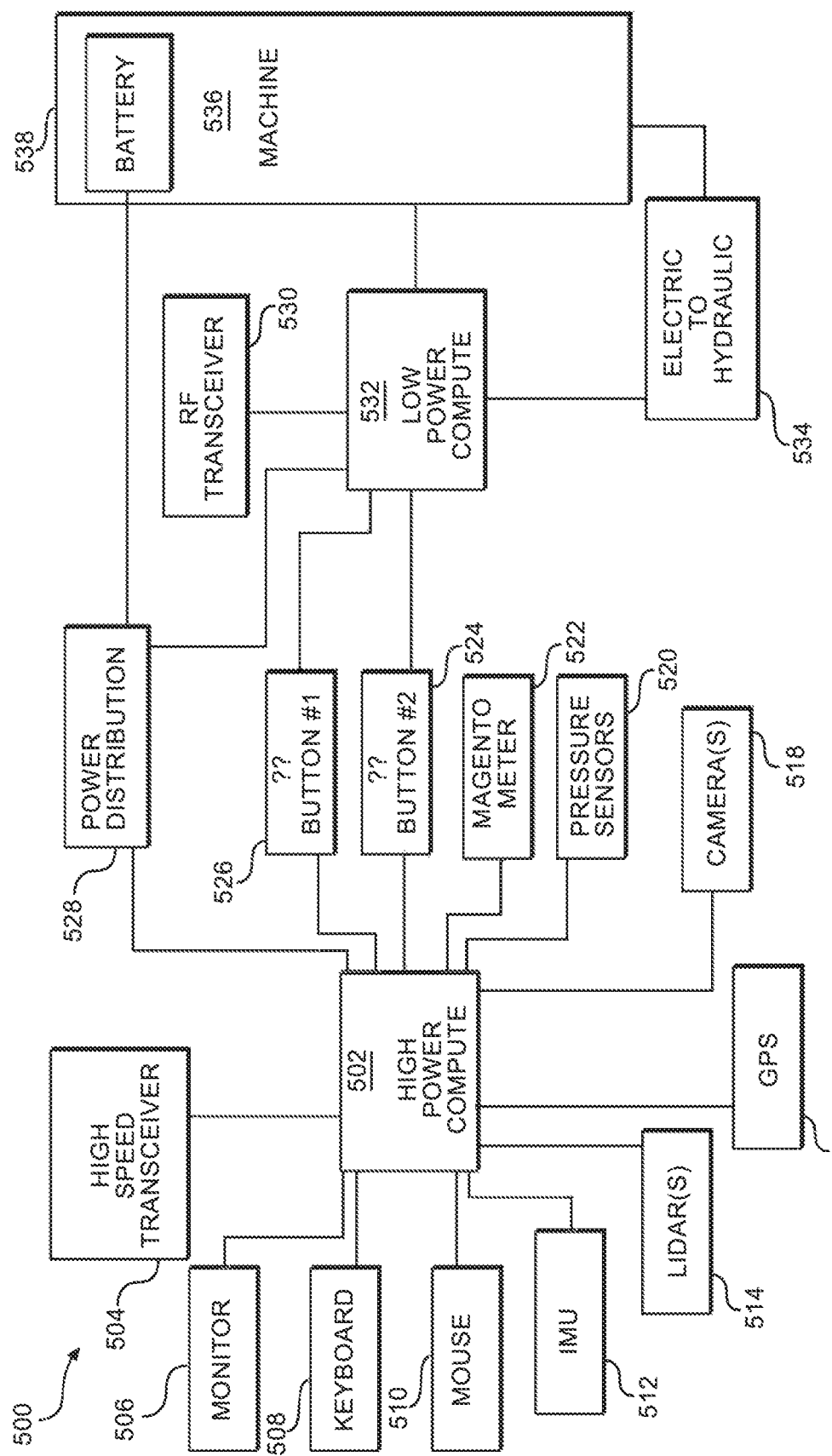
FIG. 5 is a diagram illustrating an exemplary environment in which some embodiments may operate.

As shown in FIG. 5, a vehicle system 500 includes a high-power compute module 502 and a low-power compute 532 module. A high speed transceiver 504, monitor 506, keyboard 508, computer mouse 510, inertial measurement unit 512, lidar unit(s) 514, geographical positioning system (s) 516, camera(s) 518, pressure sensor(s) 520, emergency stop buttons 524, 526 and power distribution unit(s) 528 may communicate with or be connected to the high-power compute module 502. The emergency buttons 524, 526 and power distribution unit(s) 528 may communicate with or be connected to the low-power compute module 532 as well. A radio-frequency transceiver 530 and electric-to-hydraulic conversion module(s) 534 may also communicate with or be connected to the low-power compute module 532. In some embodiments, there may be additional radio-frequency transceivers included in a fail-safe/high integrity portion of the system 500. This 2nd radio is adding redundancy to the system and is typically operating on a different frequency (spectral diversity). The low-power compute module 532 may communicate with or be connected to machinery 536 of the vehicle system 500. The machinery 536 may include one or more batteries 538. The one or more batteries 538 may communicate with or be connected to the power distribution unit(s) 528. In some embodiments, one or more batteries may be adjacent to the power distribution unit 528 as opposed to being included as part of the machinery 536 of the vehicle system 500. It is understood that the sensor data sent to a base station(s) may include data or be based on data from any of the modules, features, equipment, machinery and components shown in the FIG. 5.

Figure 6:
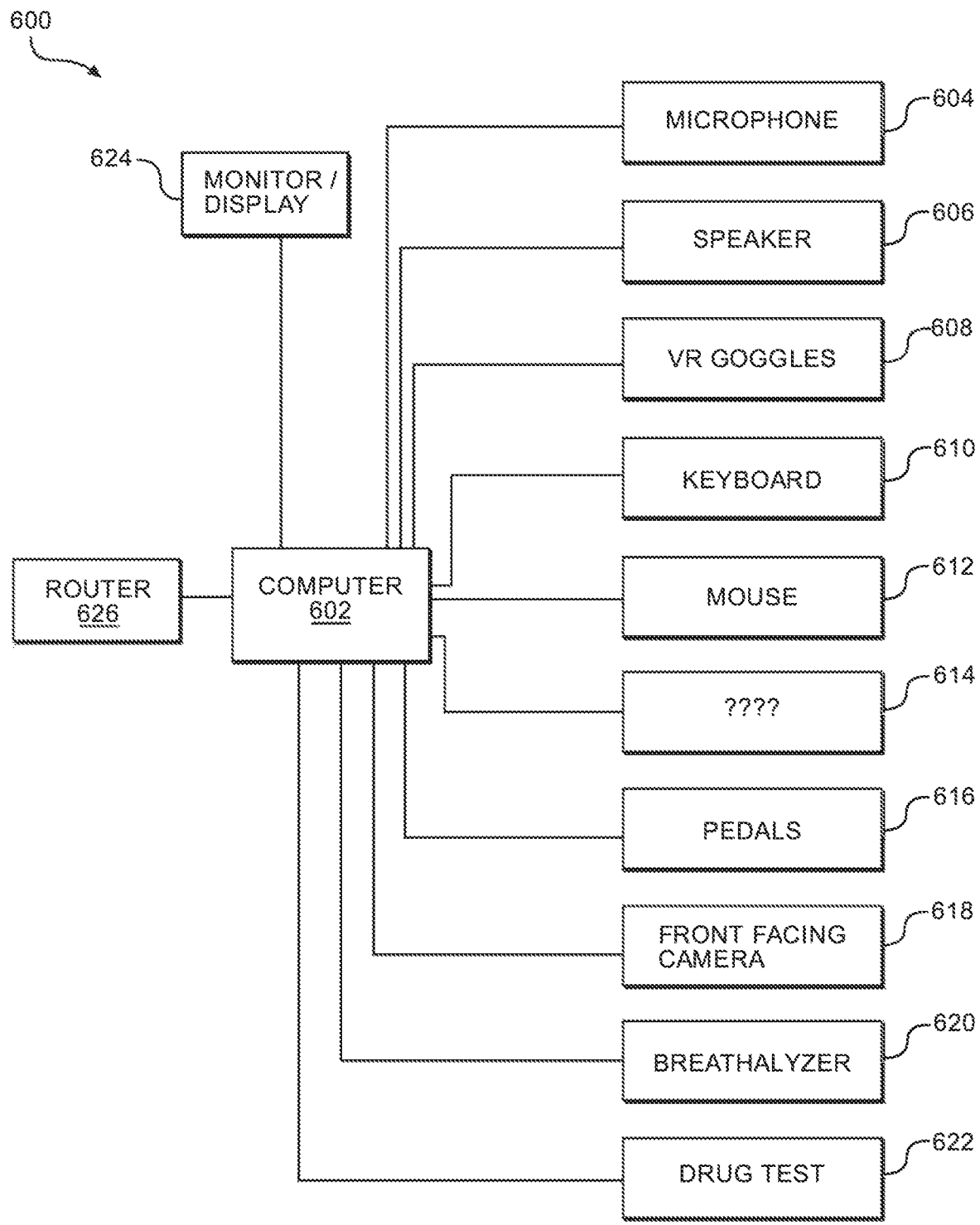
FIG. 6 is a diagram illustrating an exemplary environment in which some embodiments may operate.

As shown in FIG. 6, control console 600 located at a control center may include a computer 602 and a router 626. A monitor(s)/display(s) 604, speaker(s) 606, virtual reality google(s) 608, keyboard(s) 610, mouse(s) 612, joystick(s) 614, pedal(s) 616, front-facing camera(s) 618, breathalyzer module(s) 620 and drug test module(s) 622 may communicate with or be connected to the computer 602. The control console 600 may also include a control panel with input devices, such as buttons. The control console 600 may also include one or more touchscreens for display of graphical dashboards to provide visualization and summary of data. Transmissions between one or more base stations and the control center may occur via the router 626. There may be one or more additional routers to allow for connection via various different media, such as when a first router connects via wired internet plus WiFi while another second router connects via a LTE network. According to various embodiments, one or more control center commands may be selected by an operator of the control console 600. The control center commands may be sent to a base station(s) 316 and the base station 316 converts the control center commands to data compatible with one or more vehicles that are the intended recipients of the control center commands. For example, a control center command sent to the base station 316 may represent an approval by the operator for a vehicle(s) to perform a particular vehicle action. Upon receipt of the control center command, the base station 316 generates vehicle action output representing one or more vehicle actions to be performed by the intended vehicles to bring into effect the vehicle actions approved by the operator of the control console 600.

Embodiments may be used on a wide variety of computing devices in accordance with the definition of computer and computer system earlier in this patent. Mobile devices such as cellular phones, smart phones, PDAs, and tablets may implement the functionality described in this patent. A mobile device is any portable device.

Figure 7:
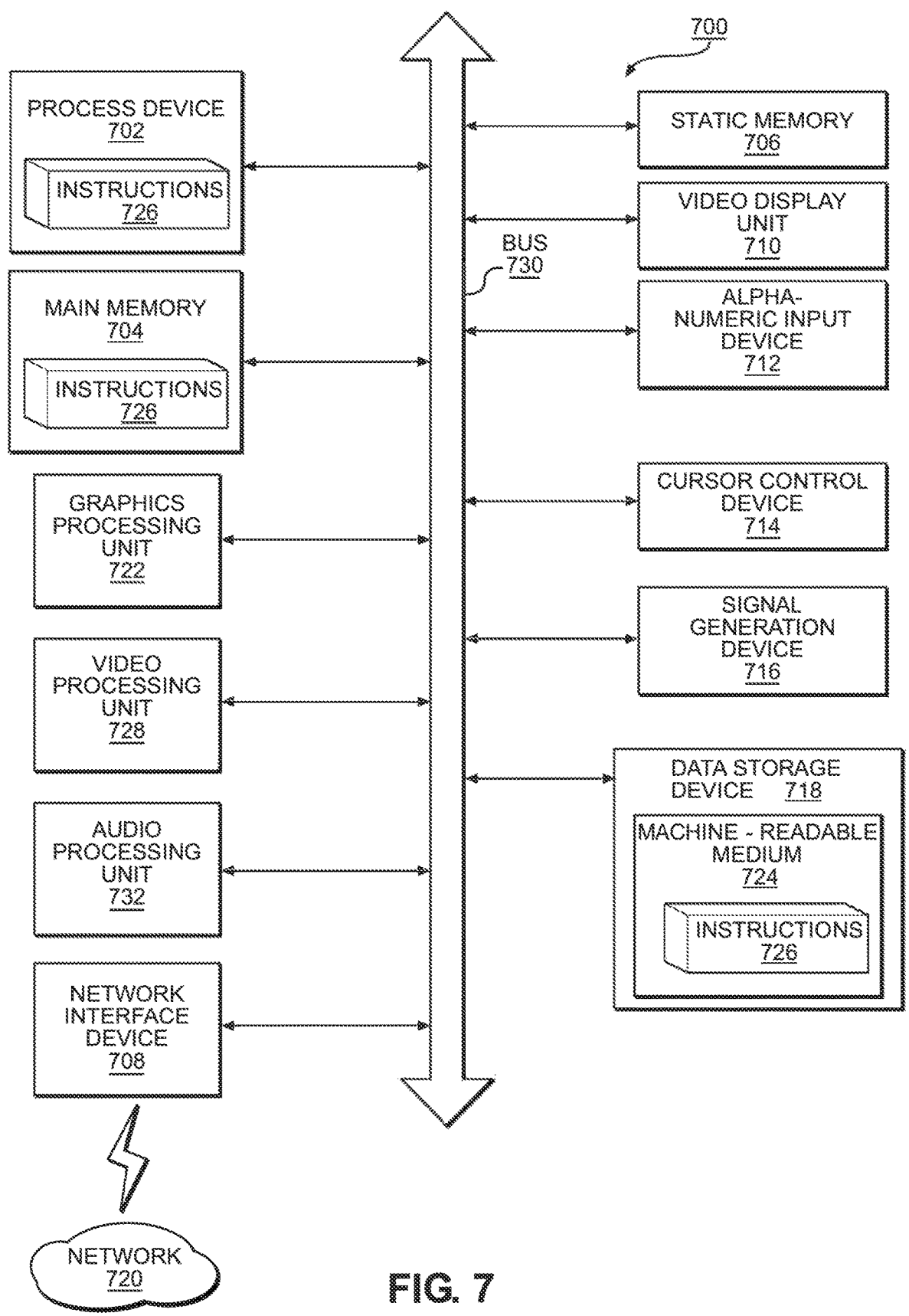
FIG. 7 is a diagram illustrating an exemplary computer that may perform processing in some embodiments.

FIG. 7 illustrates one environment in which some embodiments may operate.

Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium 710 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A system comprising:
 a construction vehicle system, comprising a high-power compute module, a low-power compute module, and vehicle sensors, the construction vehicle system integrated into a construction vehicle at a construction site, the construction vehicle further comprising vehicle transceiver, vehicle machinery, vehicle battery, and vehicle power distribution, the vehicle sensors coupled with the high-power compute module, and the vehicle machinery coupled with the low-power compute module, the vehicle sensors, generating vehicle sensor data;
 one or more processors; and
 a non-transitory computer readable medium storing a plurality of instructions, which when executed, cause the one or more processors to perform operations comprising:
  generating a mesh network at the construction site, the mesh network comprising a plurality of site-mesh nodes, each site mesh node, comprising a base-station module, each base station module, comprising a deported compute module, the deported compute modules, comprising one or more artificial intelligence modules, artificial intelligence modules comprising one or more machine learning networks, receiving the vehicle sensor data as input and outputting vehicle operations, comprising one or more of vehicle localization, nearby object detection, and vehicle path planning;
  the one or more deported compute modules, generating, based on the vehicle sensor data and the output of the machine learning networks, a first output comprising vehicle actions;
  transmitting the vehicle actions to the construction vehicle transceiver, and a low-power compute module of the construction vehicle;
  the high-power compute module and/or the low-power compute module of construction vehicle, causing the construction vehicle machinery to perform the vehicle actions.

2. The system of claim 1, further comprising:
 the plurality of site-mesh nodes, each individually generating the first output, comprising the vehicle actions and a second output, representing one or more control center actions of a control center,
 wherein the plurality of site-mesh nodes is physically located proximately to the construction site, the construction site comprising a plurality of construction vehicles remotely situated away from each site-mesh node, and
 wherein each construction vehicle from the plurality of construction vehicles operate within the construction site.

3. The system of claim 2:
 wherein each construction vehicle from the plurality of construction vehicles operates at the construction site,
 wherein the control center is remotely situated away from the construction site.

4. The system of claim 2,
 wherein operation of the plurality of site-mesh nodes creates the mesh network at the construction site for transmissions between each site-mesh node and the plurality of the construction vehicles.

5. The system of claim 1, wherein the vehicle operations comprise operations for at least one of: vehicle perception operations, vehicle prediction operations, vehicle path planning operations, and vehicle localization operations.

6. The system of claim 5, wherein the vehicle perception operations comprise:
 one or more operations to generate bounding boxes and segmentations for recognition and labeling of at least one physical object proximate to the construction vehicle, wherein the first output includes output from the vehicle perception operations to be sent from a site-mesh node to the construction vehicle,
 wherein the output from the vehicle perception operations represents the vehicle actions to be performed by the construction vehicle in response to perception of the at least one physical object proximate to the construction vehicle.

7. The system of claim 5, wherein the vehicle prediction operations comprise:
 one or more operations to generate a forecast of alocation of at least one physical object proximate to construction vehicle, based on a current orientation, trajectory and velocity of the at least one physical object,
 wherein the first output includes output from the vehicle prediction operations to be sent from a site-mesh node to the construction vehicle,
 wherein the output from the vehicle perception operations represents the vehicle actions to be performed by the construction vehicle in response to the forecast of the location of the at least one physical object.

8. The system of claim 5, wherein the vehicle path planning operations comprise:
 one or more operations to determine a travel path for the construction vehicle, based at least on output from the vehicle perception operations and output from the vehicle prediction operations,
 wherein the first output includes output from the vehicle path planning operations to be sent from a site-mesh node to the construction vehicle,
 wherein the output from the vehicle path planning operations represents the vehicle actions to be performed by the construction vehicle with respect to the travel path.

9. The system of claim 5, wherein the vehicle localization operations comprise:
 one or more operations to determine a location of the construction vehicle based at least on a direction of the construction vehicle and a positional orientation of the construction vehicle,
 wherein the output from vehicle localization operations includes, in part, input for the vehicle perception operations and the vehicle prediction operations.

10. The system of claim 1, wherein the operations further comprise:
 generating a second output based on video data, the second output representing one or more approved control center actions, based on the vehicle senor data and the video data;
 triggering transmission of the second output to the construction vehicle.

11. A computer-implemented method comprising:
 providing a construction vehicle system, comprising a high-power compute module, a low-power compute module, and vehicle sensors;
 integrating the construction vehicle system into a construction vehicle at a construction site, the construction vehicle further comprising vehicle transceiver, vehicle machinery, vehicle battery, and vehicle power distribution, the vehicle sensors coupled with the high-power compute module, and the vehicle machinery coupled with the low-power compute module, the vehicle sensors, generating vehicle sensor data;

generating a mesh network at the construction site, the mesh network comprising a plurality of site-mesh nodes, each site mesh node, comprising a base-station module, each base station module, comprising a deported compute module, the deported compute modules, comprising one or more artificial intelligence modules, artificial intelligence modules comprising one or more machine learning networks, receiving the vehicle sensor data as input and outputting vehicle operations, comprising one or more of vehicle localization, nearby object detection, and vehicle path planning;

the one or more deported compute modules, generating, based on the vehicle sensor data and the output of the machine learning networks, a first output comprising vehicle actions;

transmitting the vehicle actions to the construction vehicle transceiver, and a low-power compute module of the construction vehicle;

the high-power compute module and/or the low-power compute module of construction vehicle, causing the construction vehicle machinery to perform the vehicle actions.

12. The computer-implemented method of claim 11, further comprising:

the plurality of site-mesh nodes, each individually generating the first output, comprising the vehicle actions and a second output, representing one or more control center actions of a control center;

wherein the plurality of site-mesh nodes are physically located proximately to the construction site, the construction site comprising a plurality of construction vehicles, remotely situated away from each respective the site-mesh node; and wherein each construction vehicle from the plurality of remotely situated construction vehicles operate within the construction site.

13. The computer-implemented method of claim 12, wherein each construction vehicle from the plurality of construction vehicles operates at the construction site, wherein the control center is remotely situated away from the construction site.

14. The computer-implemented method of claim 12, wherein operation of the plurality of site-mesh nodes creates the mesh network at the the construction site for transmissions between each site-mesh node and the plurality of construction vehicles.

15. The computer-implemented method of claim 12, wherein the vehicle operations comprise operations for at least one of: vehicle perception operations, vehicle prediction operations, vehicle path planning operations, and vehicle localization operations.

16. The computer-implemented method of claim 15, wherein the vehicle perception operations comprise:

one or more operations to generate bounding boxes and segmentations for recognition and labeling of at least one physical object proximate to the vehicle, wherein the first output includes output from the vehicle perception operations to be sent from a site-mesh node to the construction vehicle, wherein the output from the vehicle perception operations represents the vehicle actions to be performed by the construction vehicle in response to perception of the at least one physical object proximate to the construction vehicle.

17. The computer-implemented method of claim 15, wherein the vehicle prediction operations comprise:

one or more operations to generate a forecast of alocation of at least one physical object proximate to the construction vehicle, based one a current orientation, trajectory and velocity of the at least one physical object, wherein the first output includes output from the vehicle prediction operations to be sent from a site-mesh node to the construction vehicle, wherein the output from the vehicle perception operations represents the vehicle actions to be performed by the construction vehicle in response to the forecast of the location of the at least one physical object.

18. The computer-implemented method of claim 15, wherein the vehicle path planning operations comprise:

one or more operations to determine a travel path for the construction vehicle, based at least on output from the vehicle perception operations and output from the vehicle prediction operations, wherein the first output includes output from the vehicle path planning operations to be sent from a site-mesh node to the construction vehicle, wherein the output from the vehicle path planning operations represents the vehicle actions to be performed by the construction vehicle with respect to the travel path.

19. The computer-implemented method of claim 15, wherein the vehicle localization operations comprise:

one or more operations to determine a location of the construction vehicle, based at least on a direction of the construction vehicle and a positional orientation of the construction vehicle, wherein the output from vehicle localization operations includes, in part, input for the vehicle perception operations and the vehicle prediction operations.

20. The computer-implemented method of claim 11, further comprising:

generating a second output based on video data, the second output representing one or more approved control center actions, based on the vehicle senor data and the video data.

* * * * *